United States Patent
Braca et al.

(10) Patent No.: US 10,933,998 B2
(45) Date of Patent: Mar. 2, 2021

(54) SEAT ARRAY, PARTICULARLY FOR AIRCRAFT

(71) Applicant: OPTIMARES S.p.A., Sezze Scalo Latium (IT)

(72) Inventors: Alessandro Braca, Sezze Scalo (IT); Alessio Morsicani, Sezze Scalo (IT); Andrea Giordano, Sezze Scalo (IT)

(73) Assignee: OPTIMARES S.p.A., Sezze Scalo Lt (IT)

( * ) Notice: Subject to any disclaimer, the term of this patent is extended or adjusted under 35 U.S.C. 154(b) by 251 days.

(21) Appl. No.: 15/925,971

(22) Filed: Mar. 20, 2018

(65) Prior Publication Data

US 2018/0281959 A1    Oct. 4, 2018

(30) Foreign Application Priority Data

Mar. 20, 2017 (IT) .................. 102017000030255
Apr. 12, 2017 (IT) .................. 102017000040455
Apr. 28, 2017 (IT) .................. 102017000046200

(51) Int. Cl.
  *B64D 11/06* (2006.01)
  *B60N 2/01* (2006.01)
  *B64D 11/00* (2006.01)

(52) U.S. Cl.
  CPC ............ *B64D 11/0601* (2014.12); *B60N 2/01* (2013.01); *B64D 11/0604* (2014.12);
  (Continued)

(58) Field of Classification Search
  CPC ............ B64D 11/0601; B64D 11/0602; B64D 11/0604; B64D 11/0606
  See application file for complete search history.

(56) References Cited

U.S. PATENT DOCUMENTS 6,000,659 A    12/1999  Brauer
7,178,871 B1    2/2007  Round
(Continued)

FOREIGN PATENT DOCUMENTS

EP    0 850 834 A1    7/1998
EP    1 121 291 B1    1/2005
(Continued)

OTHER PUBLICATIONS

Search Report in Italian Patent Application No. IT 102017000030255, dated Oct. 4, 2017.
(Continued)

*Primary Examiner* — Nicholas McFall
*Assistant Examiner* — Terri L Filosi
(74) *Attorney, Agent, or Firm* — Hershkovitz & Associates, PLLC; Abe Hershkovitz

(57) ABSTRACT

A seat array that includes a first and a second seat arranged with their backrests opposite one another, seats being able to move from a sitting position to a lying position, a portion of a dividing wall being arranged laterally with respect to the seats, the portion of dividing wall being provided in such a way as to leave an entry/exit passage, and thus access, to the seats, the entry/exit passage leading to a lane for reaching the first or the second seat, the dividing walls, on their respective end constituting the entry/exit passage provide, externally, a respective footrest, which is positioned in front of a respective third and fourth seats, which are arranged in an opposite direction with respect to the respective seat arranged on the opposite side of the same dividing wall.

24 Claims, 14 Drawing Sheets

(52) U.S. Cl.
CPC ...... *B64D 11/0606* (2014.12); *B64D 11/0641* (2014.12); *B64D 11/0643* (2014.12); *B64D 2011/0069* (2013.01)

(56) References Cited

U.S. PATENT DOCUMENTS

| | | | |
|---|---|---|---|
| 2005/0067870 A1* | 3/2005 | Rezag | B64D 11/06 297/354.13 |
| 2007/0102577 A1 | 5/2007 | Saint-Jalmes et al. | |
| 2012/0223186 A1 | 9/2012 | Henshaw | |
| 2012/0223557 A1 | 9/2012 | Henshaw | |
| 2014/0283296 A1 | 9/2014 | Jerome et al. | |
| 2015/0069805 A1 | 3/2015 | Henshaw | |
| 2015/0166183 A1 | 6/2015 | Henshaw | |
| 2015/0329208 A1 | 11/2015 | Eakins | |
| 2016/0052633 A1* | 2/2016 | Lawson | B64D 11/00 244/118.6 |
| 2016/0122022 A1 | 5/2016 | Cooke et al. | |
| 2016/0288910 A1 | 10/2016 | Udriste et al. | |
| 2016/0297529 A1 | 10/2016 | Cailleteau | |
| 2017/0029118 A1 | 2/2017 | Ehrman et al. | |
| 2017/0088267 A1 | 3/2017 | Dowty et al. | |
| 2018/0022458 A1* | 1/2018 | Weifenbach | B64D 11/0601 |

FOREIGN PATENT DOCUMENTS

| | | |
|---|---|---|
| EP | 2 944 571 A1 | 11/2015 |
| WO | WO 01/87120 A1 | 11/2001 |
| WO | WO 2010/131014 A1 | 11/2010 |
| WO | WO 2015/083086 A1 | 6/2015 |
| WO | WO 2015/155687 A1 | 10/2015 |
| WO | WO 2016/049341 A1 | 3/2016 |
| WO | WO 2016/141158 A1 | 9/2016 |
| WO | WO 2017/059053 A1 | 4/2017 |

OTHER PUBLICATIONS

Written Opinion in Italian Patent Application No. IT 102017000030255, dated Oct. 4, 2017.
Search Report in Italian Patent Application No. IT 102017000040455, dated Oct. 12, 2017.
Written Opinion in Italian Patent Application No. IT 102017000040455, dated Oct. 12, 2017.
Search Report in Italian Patent Application No. IT 102017000046200, dated Oct. 13, 2017.
Written Opinion in Italian Patent Application No. IT 102017000046200, dated Oct. 13, 2017.
Extended European Search Report in Patent Application No. EP 18211771.3, dated Mar. 15, 2019.

* cited by examiner

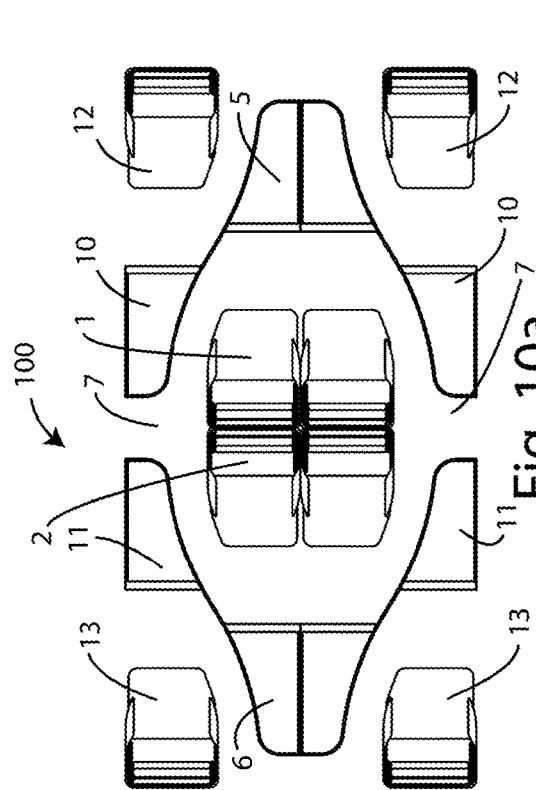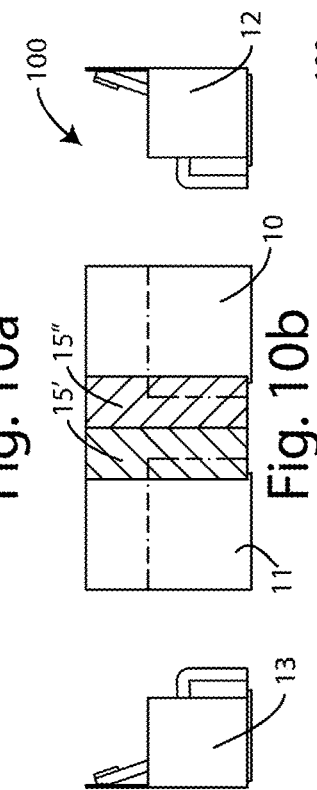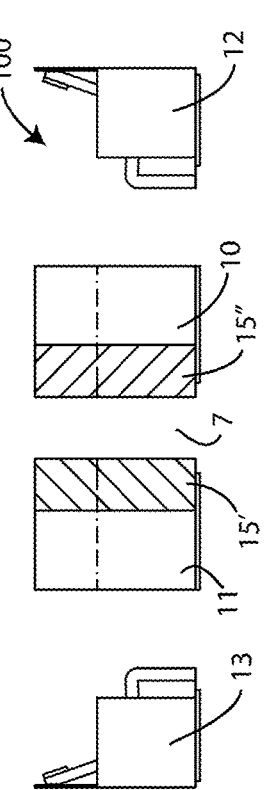
Fig. 10a  Fig. 10b  Fig. 10c
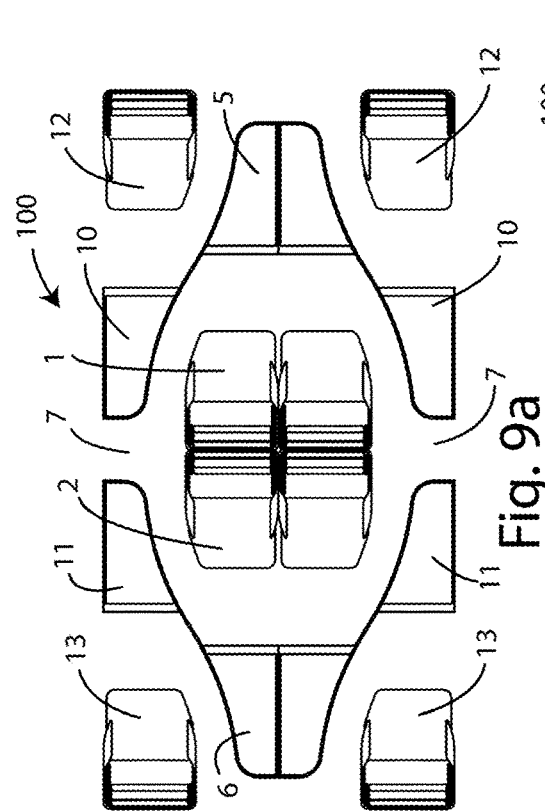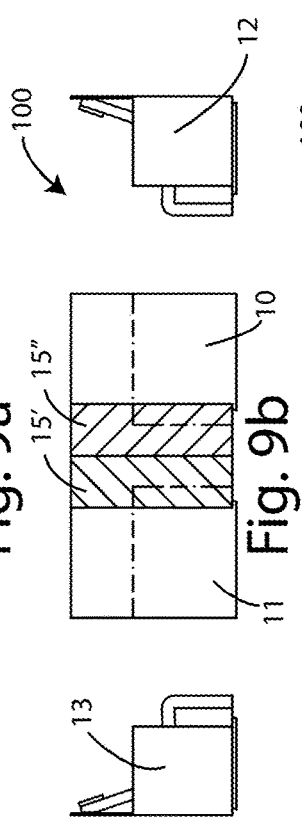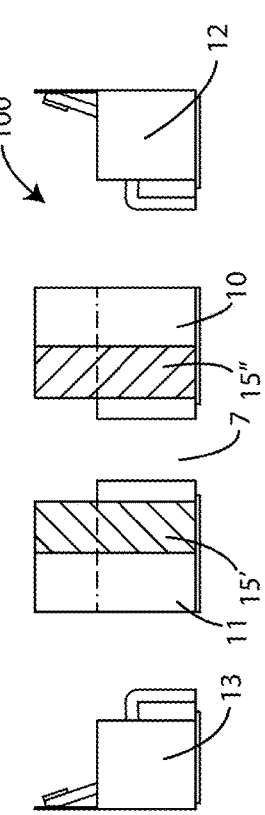
Fig. 9a  Fig. 9b  Fig. 9c

SEAT ARRAY, PARTICULARLY FOR AIRCRAFT

BACKGROUND OF THE INVENTION

1. Field of the Invention

The present invention relates to a seat array, in particular for aircraft.

In greater detail, the invention relates to an array of the said type, specifically designed for business class in aircraft, which enables optimising both the quality of the service and the fullest exploitation of the area intended for the business class with the greatest possible number of seats, without in anyway compromising the comfort of the passenger.

2. Description of Related Art

In recent years many solutions have been proposed and realised relating to various arrangements of the seats in the business class of aircraft, with the aim of fully exploiting the intended area, with therefore the greatest number of seats per area, while seeking to match this need with the need for passenger comfort and the quality of the service to the passenger by the stewards/hostesses.

Some solutions, which are mentioned purely by way of example, are described for example in patent documents US 2007/0102577, U.S. Pat. No. 7,178,871, US 2009/0302158, US 2012/0223186, US2016/0122022, U.S. D741,609, WO 2010/018367, WO 2014/155353, WO 2015/061688.

Though each of the above-described solutions enables obtaining, at least in part, the above-mentioned aims, each of them is characterised by defects that make it impractical.

Among them, only the solutions described in US 2007/0102577, US2012/0223186 and US2016/0122022 include a single entry/exit shared by two window seats.

However, in each solution, the seats are arranged one in front of the other, and therefore, since a space also needs to be provided for the reclined position, the space occupied cannot be optimal.

SUMMARY OF THE INVENTION

The foregoing is the context of the solution provided by the present invention, which provides a seat array wherein there are two seats in the array, with the backrests thereof facing one another, and with a single service entry/exit for the two seats.

The solution of the present invention enables obtaining important advantages:
- a maximum rationalisation of the space occupied;
- an excellent degree of comfort for the passenger;
- extremely advantageous work/service conditions for the on-board personnel.

Therefore a specific object of the present invention is to disclose a seat array, comprising a first and a second seats, arranged with their backrests opposite one another, said first and second seats being able to move from a sitting position to a lying position, possibly with possibility of stopping at each of the intermediate positions, a portion of dividing wall being arranged laterally with respect to said seats, said portion of dividing wall being provided extending laterally at one side of said first and second seats and ending, on one side in a portion containing a footrest, arranged in front of the respective seat, and on the other side at a distance from the respective side of the dividing wall of the seat, in such a way as to leave an entry/exit passage, and thus access, to the seats, said entry/exit passage leading to a lane for reaching the first or the second seat, said dividing walls on respective ends thereof constituting the entry/exit passage providing, externally, a respective footrest, which is positioned in front of a respective third and fourth seats, which are arranged in an opposite direction with respect to the respective seat arranged on the opposite side of the same dividing wall, said third and fourth seats also being able to move from a sitting position to a lying position, possibly with possibility of stopping at each of the intermediate positions.

In particular, according to the invention, the width of the footrest of each seat can be smaller than the width of the respective seat and each dividing wall can be arranged substantially diagonally between the two respective footrests of each pair of opposite seats.

Also, according to the invention, said passage can be substantially located at said opposite backrests of the first and second seats.

Again, according to the invention, an item of furniture can be provided at the footrest of the first and/or the second seats.

Preferably, according to the invention, at least one door can be provided on said passage.

Further, according to the invention, each of said footrests in front of the respective seat, when the seat is in the lying position or an almost-lying position, can allow the passenger to assume a substantially "in-bed" position, i.e., an "in-bed" or "almost-in-bed" position.

Lastly, according to the invention, an item of furniture can be provided between the backrests of said first and second seats.

Further, an object of the present invention is an arrangement of a plurality of seat arrays as described in the foregoing internally of a cabin of a transport mean in particular for an aircraft, said cabin having a longitudinal axis and two lateral dividing walls.

Preferably, according to the invention, the axis of said first, second, third and fourth seats can be parallel to said longitudinal axis of the cabin.

Further according to the invention, the axis of said first, second, third and fourth seats can be angled with respect to said longitudinal axis of the cabin, said angle being not more than 18°, preferably between 1 and 8°.

Further, according to the invention, the axis of the first and second seats can be angled by a different angle with respect to the axis of the third and fourth seats, in particular the axis of the first and second seats can be angled by an angle comprised between 1° and 12°, in particular 4°, and the axis of the third and fourth seats can be angled by an angle of less than 18°, in particular 16°.

In particular, according to the invention, the axis of each seat can be inclined with respect to the longitudinal axis of the cabin in the opposite direction with respect to the respective dividing wall, so as to obtain a lateral space for each seat at the respective armrest arranged on the opposite side with respect to the respective dividing wall.

Once more according to the invention, said arrangement can provide at least two seat arrays adjacent to one another and symmetrical with respect to an axis that is parallel to the longitudinal axis of the cabin, and the resulting adjacent seats can be configurable in a double bed.

Again, according to the invention, said arrangement can provide a panel or a dividing wall transversal to the longitudinal axis of the cabin at the passage of one or more seat arrays.

Moreover, according to the invention, said arrangement can provide at least two consecutive seat arrays substantially parallel to the longitudinal axis of the cabin and a second pair of dividing walls can be provided, creating a second passage, each dividing wall bearing a respective footrest for a fifth and sixth seats, respectively, opposite one another and said second passage can be located at the opposite backrests of the third and fourth seats of the consecutive seat arrays, said second passage leading to a lane to reach the third or fourth seats.

Lastly, according to the invention, each dividing wall can be inclined by an angle comprised between 10° and 30° with respect to the longitudinal axis of the cabin.

BRIEF DESCRIPTION OF THE DRAWINGS

The present invention will now be described, for non-limiting illustrative purposes, according to its preferred embodiments, illustrated in the figures of the accompanying drawings, wherein:

FIGS. 9a, 9b and 9c show, in a plan view and a side view, respectively, a fourth embodiment of a seat array according to the invention with the door in the closed and open position;

FIGS. 10a, 10b and 10c show, in a plan view and a side view, respectively, a fifth embodiment of a seat array according to the invention with the door in the closed and open position;

DETAILED DESCRIPTION OF THE INVENTION

Figure 1:
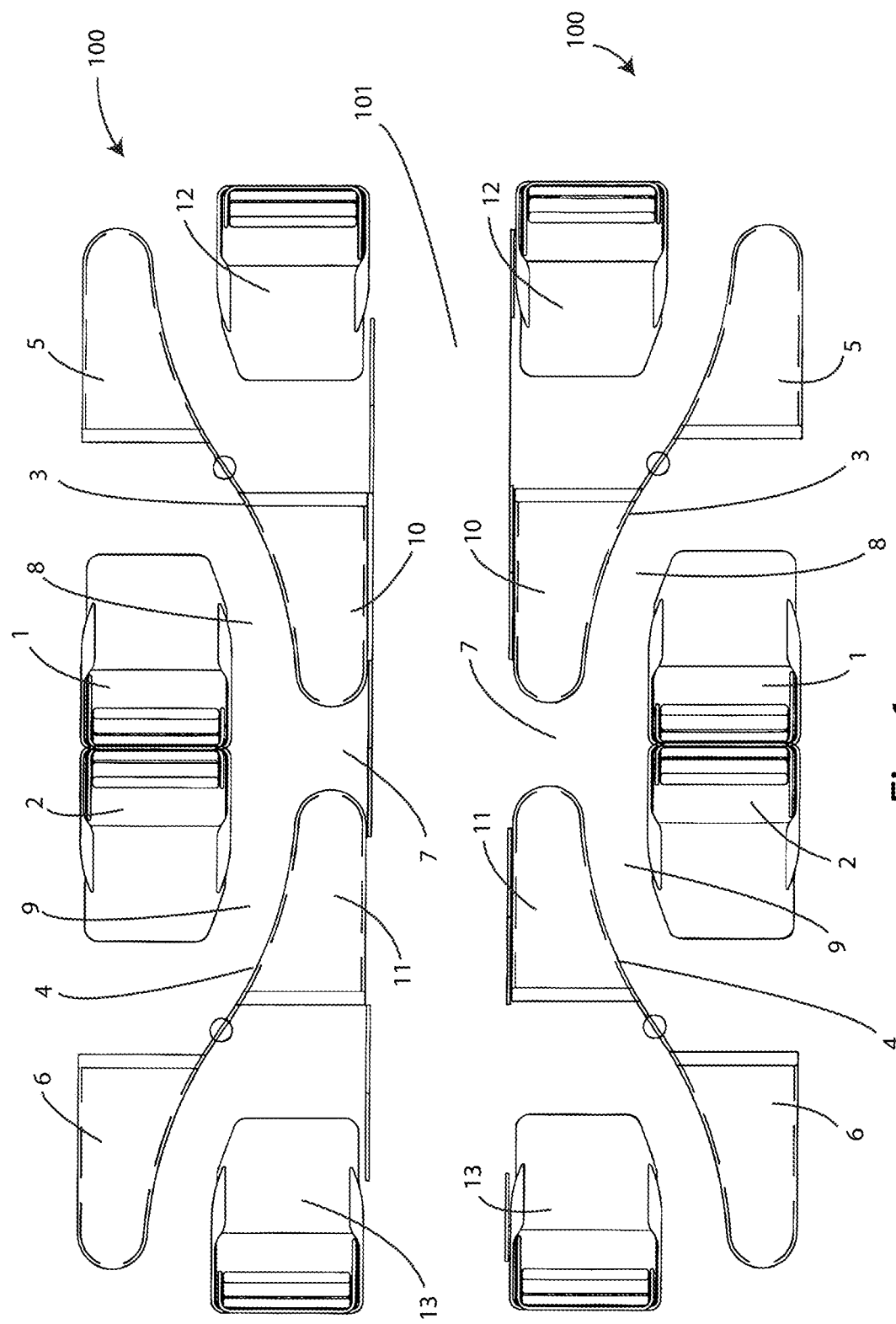
FIG. 1 schematically shows an embodiment of a seat array according to the invention.

Firstly, observing FIG. 1 of the enclosed drawings, two seat arrays according to the invention are shown, each labelled with numerical reference 100, arranged in the figures at the aisle zone 101 of the area intended for business seats of an aircraft. The same array might obviously also be used on other means of transport other than aircraft.

Each array 100 according to the invention comprises a first 1 and a second 2 seat, arranged with their backrests opposite one another, which can move from a sitting position to a lying position, possibly with possibility of stopping at each of the intermediate positions. The seats 1 and 2, as well as the others to which reference will be made in the present description, will not be described in detail, as their specific characteristics are not the object of the present invention.

A portion of dividing wall, respectively 3, 4 is provided laterally with respect to the seats 1, 2, which dividing wall extends laterally at one side of the seat 1, 2 and ends, on one side, in a portion containing a footrest 5, 6 arranged in front of the respective seat 1, 2, and on the other side at a distance from the respective side of the dividing wall 3, 4 of the seat 2, 1, in such a way as to leave an entry/exit passage 7, and thus an access, to the seats 1, 2. In particular, said entry/exit passage 7 leads to a lane, respectively 8, 9, for reaching the seat 1, 2.

The footrest 5, 6 in front of the respective seat 1, 2, when the seat 1, 2 is in the lying position (or any almost-lying position), allows the passenger to assume an "in-bed" or "almost-in-bed" position. Said dividing walls 3, 4, on their respective end constituting the entry/exit passage 7, provide, externally, a respective footrest 10, 11, which is in front of a respective third 12 and fourth 13 seats, in such a way as to allow, like the footrests 5, 6 for seats 1 and 2, when the seat 12, 13 is in the lying position (or any almost-lying position), the passenger to assume an "in-bed" or "almost-in-bed" position.

Therefore, the third 12 and fourth 13 seats are arranged in an opposite direction with respect to the respective first 1 or second 2 seats arranged on the opposite side of the same dividing wall 3 or 4.

As shown in the figures, the width of the footrest 5, 6, 10, 11 of each seat 1, 2, 12, 13 is preferably smaller than the width of the respective seat 1, 2, 12, 13. Further, each dividing wall 3, 4 is thus arranged substantially diagonally between the two respective footrests 5, 10; 6, 11 of each pair of seats 1, 12 or 2, 13 arranged in an opposite direction with respect to the dividing wall 3 or 4.

Again, according to the invention, as shown in the figures, said passage 7 can substantially be located at said opposite backrests of the first 1 and second 2 seats.

The width of said passage 7 is preferably substantially 9 inches.

As shown in the figures, the passage 7 is preferably located substantially at said opposite backrests of the first 1 and second 2 seats.

In substance, and as will emerge in the following, with reference to the following figures, independently of whether the seats 1, 2, 12, 13 have or do not have an axis parallel to the longitudinal axis X-X of the cabin 200 of the aircraft, or of the arrangement inside the cabin 200 of the aircraft of the seat array 100, the array according to the invention enables obtaining a maximum optimisation of the space within the cabin, with maximum comfort for the passenger (who will not have to step over another passenger, or be stepped over by another passenger), and maximum ease of service for the on-board personnel, who can reach every single passenger without having to pass over another, even if only by leaning over.

Figure 2:
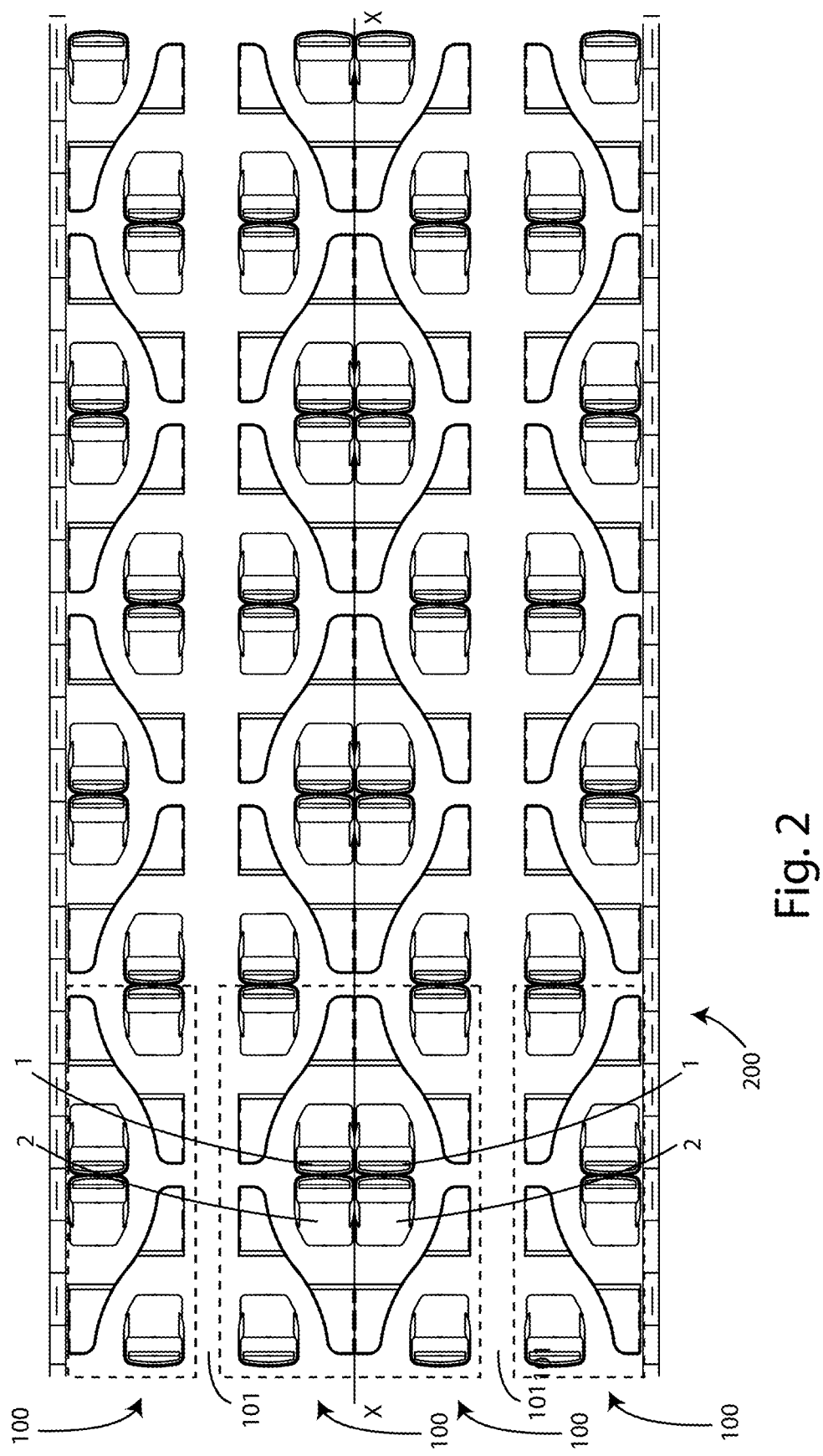
FIG. 2 schematically shows a first arrangement of the seat array of FIG. 1 in an airplane cabin.
Figure 3:
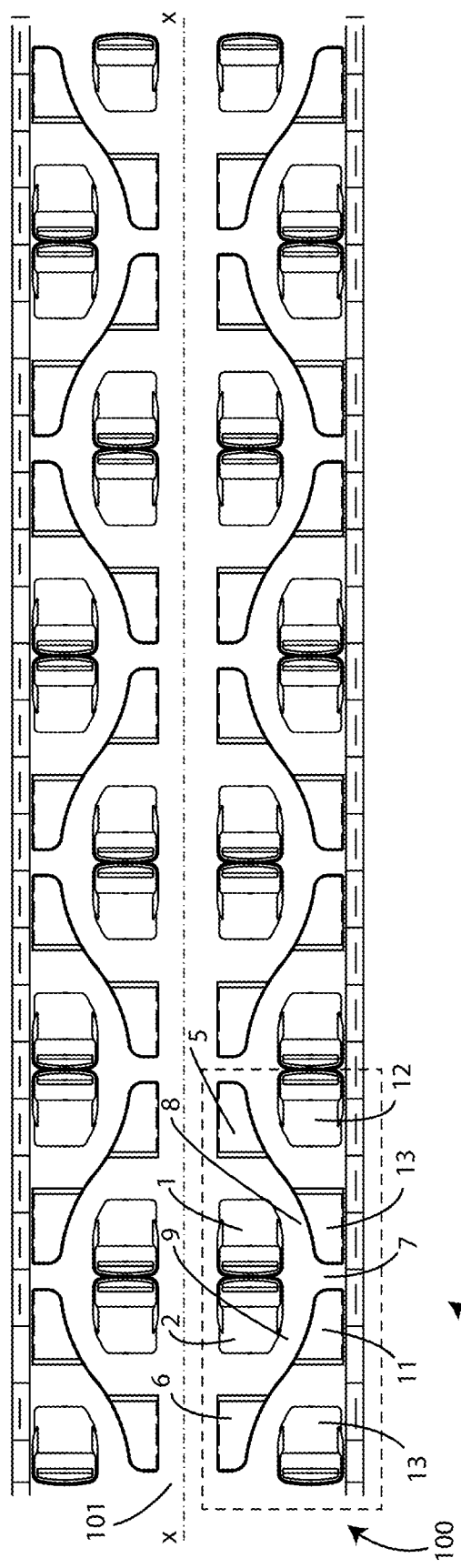
FIG. 3 schematically shows a second arrangement of the seat array of FIG. 1 in an airplane cabin.

FIGS. 2 and 3 show a first and a second arrangement of the embodiment of the array 100 according to the invention within the cabin 200, wherein the front-to-rear axes of the seats 1, 2, 12, 13 are parallel to the longitudinal axis X-X of the aircraft.

In the arrangement of FIG. 2, four columns of seat arrays 100 according to the invention are provided, in particular two columns adjacent to the walls with the windows and two columns adjacent to one another and arranged at the central longitudinal axis X-X of the aircraft, leaving two aisle zones 101 between the columns of window-seat arrays 100.

In the configuration of FIG. 2, as in other possible configurations, the seats 1, 1 and 2, 2 of two adjacent arrays 100 could, if so desired, be a double bed.

In the arrangement of FIG. 3, only two columns of seat arrays 100 are provided, divided by the central aisle zone 101.

Further, with an appropriate arrangement of the dividing walls 3, 4 between adjacent arrays 100, also in the following embodiment with the axes inclined, interaction would be possible between the four positions of the respective seats 1 and 2 of the arrays 100.

Figure 4:
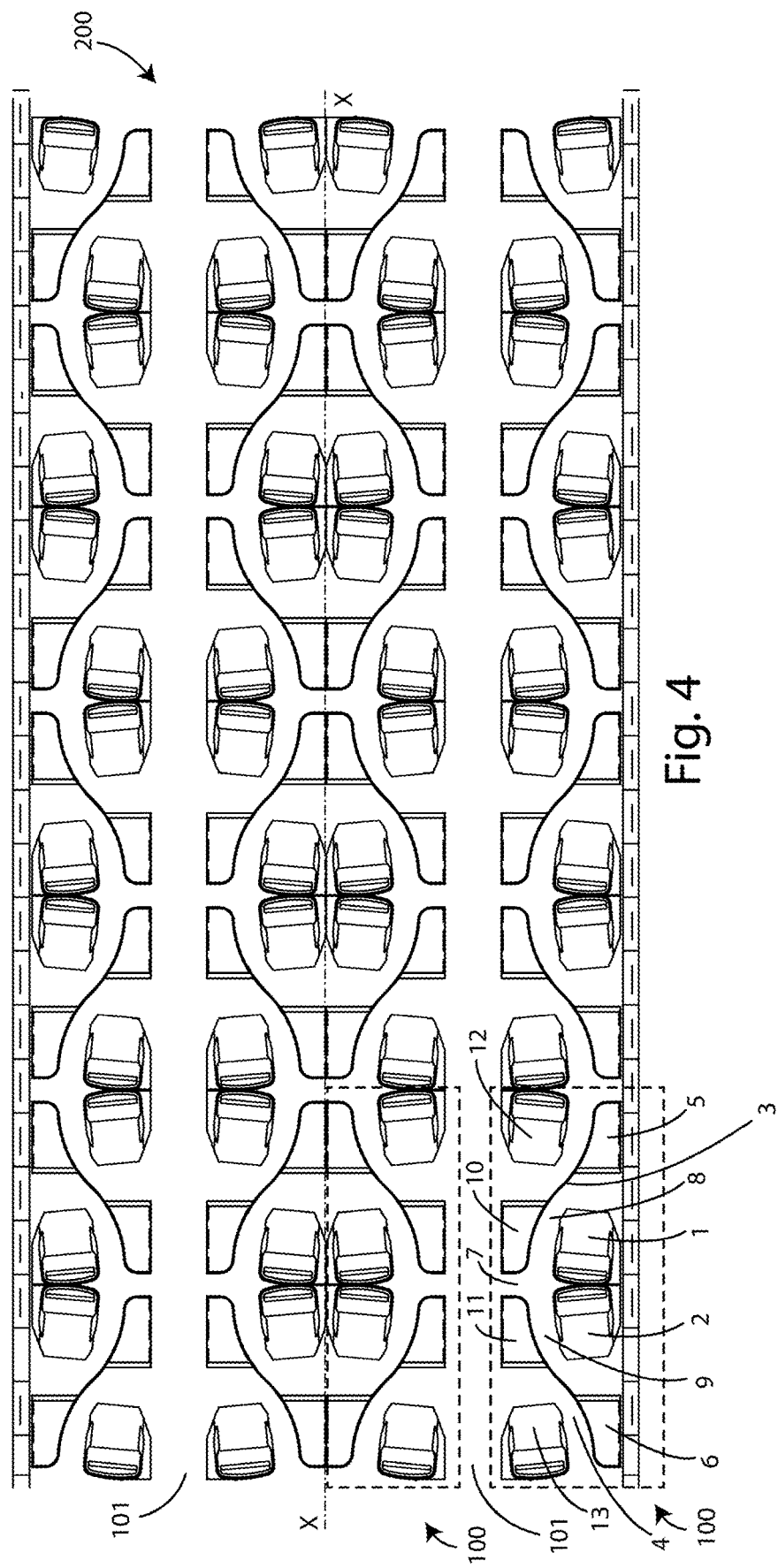
FIG. 4 schematically shows a third arrangement of the seat array of FIG. 1 in an airplane cabin.

The same arrangement of FIG. 2 is shown in FIG. 4, with, in this case, the axes of the seats 1, 2, 12, 13 inclined with respect to the axis X-X.

In particular, the axis of each seat 1, 2, 12, 13 can be inclined with respect to the axis X-X in the opposite direction with respect to the respective dividing wall 3, 4, so as to obtain an external lateral space for each seat at the respective armrest arranged on the opposite side with respect to the respective dividing wall 3, 4.

It has been found that an angle of up to about 18° (preferably about 1°-12°, in particular 8°-10°) enables obtaining the same results as indicated previously.

Figure 14:
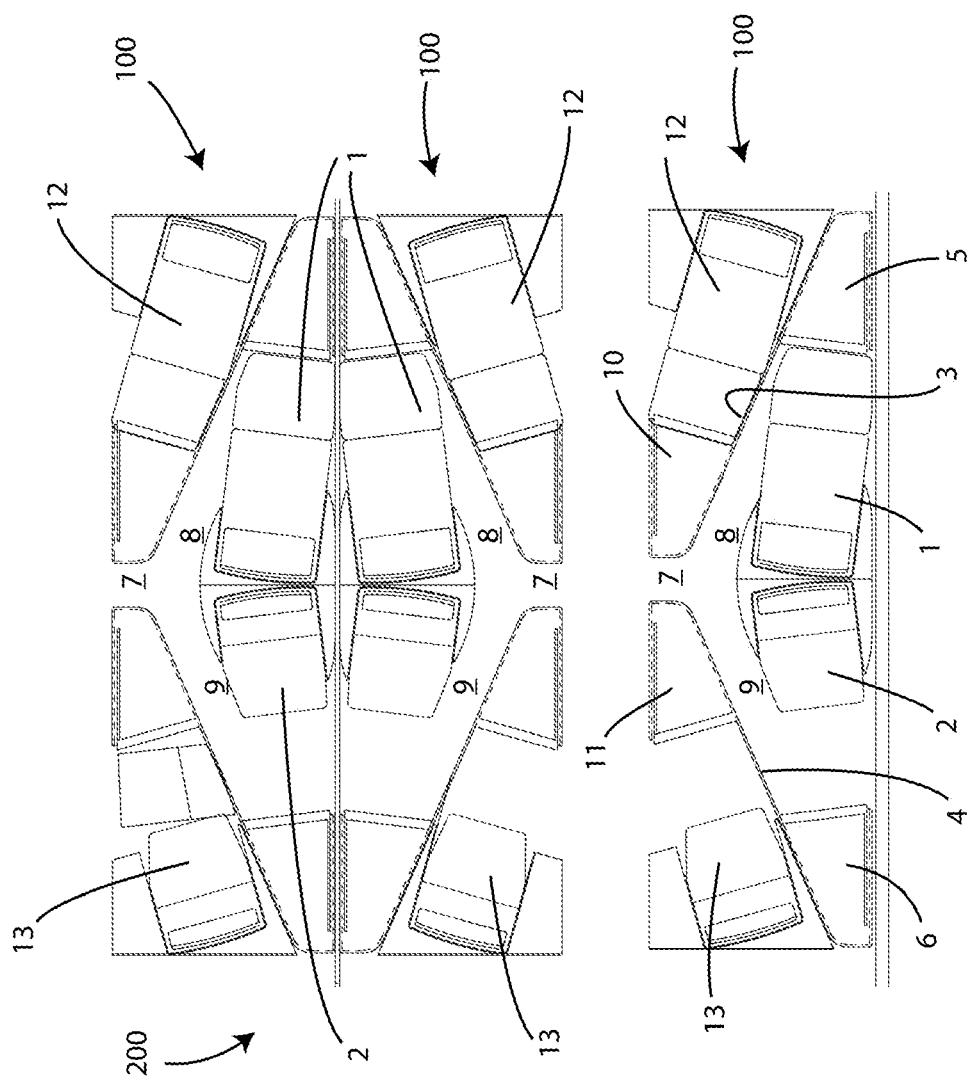
FIG. 14 schematically shows a ninth arrangement of the seat array of the invention in an airplane cabin.
Figure 15:
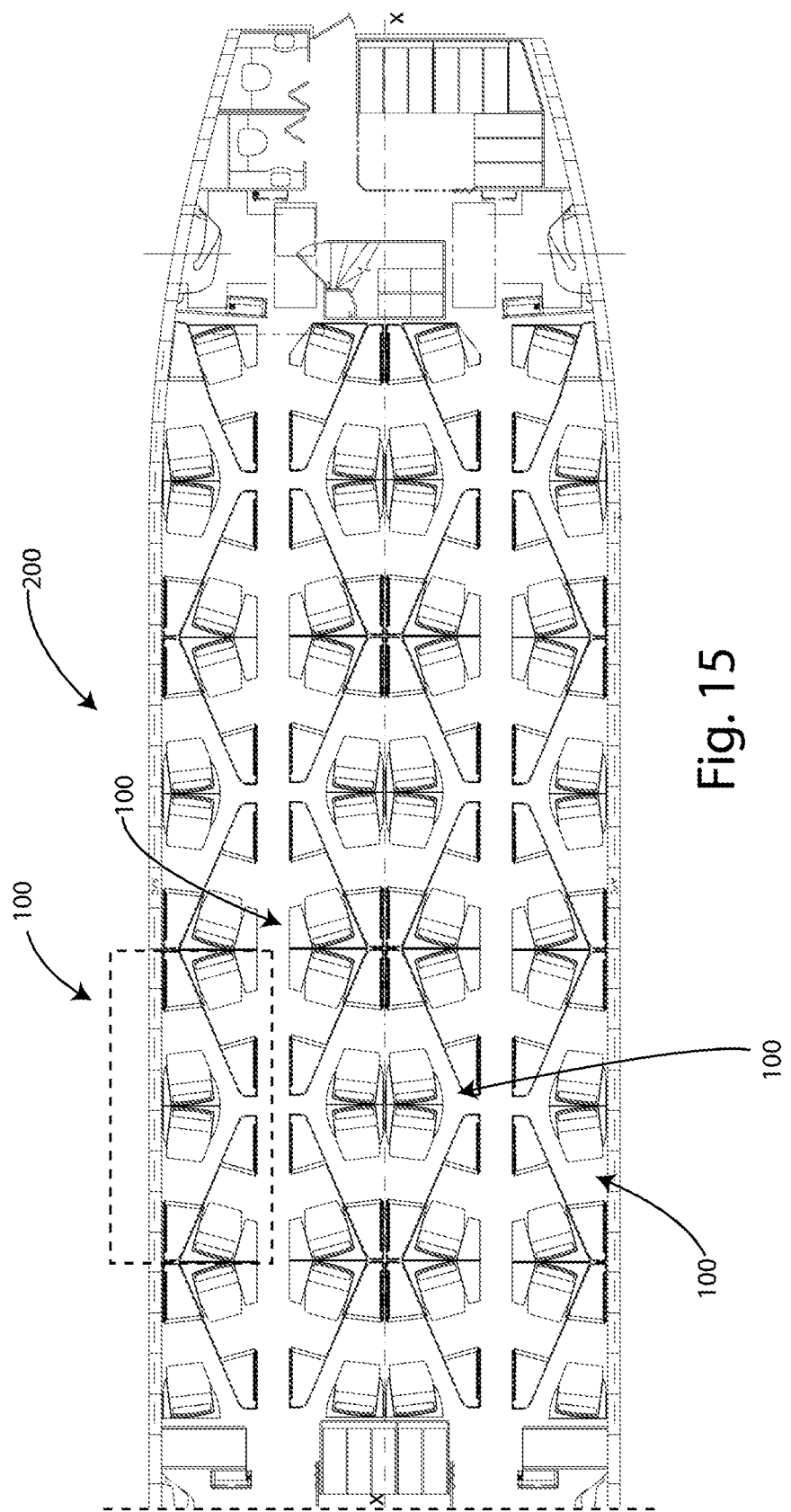
FIG. 15 schematically shows a tenth arrangement of the seat array of the invention in an airplane cabin.
Figure 16:
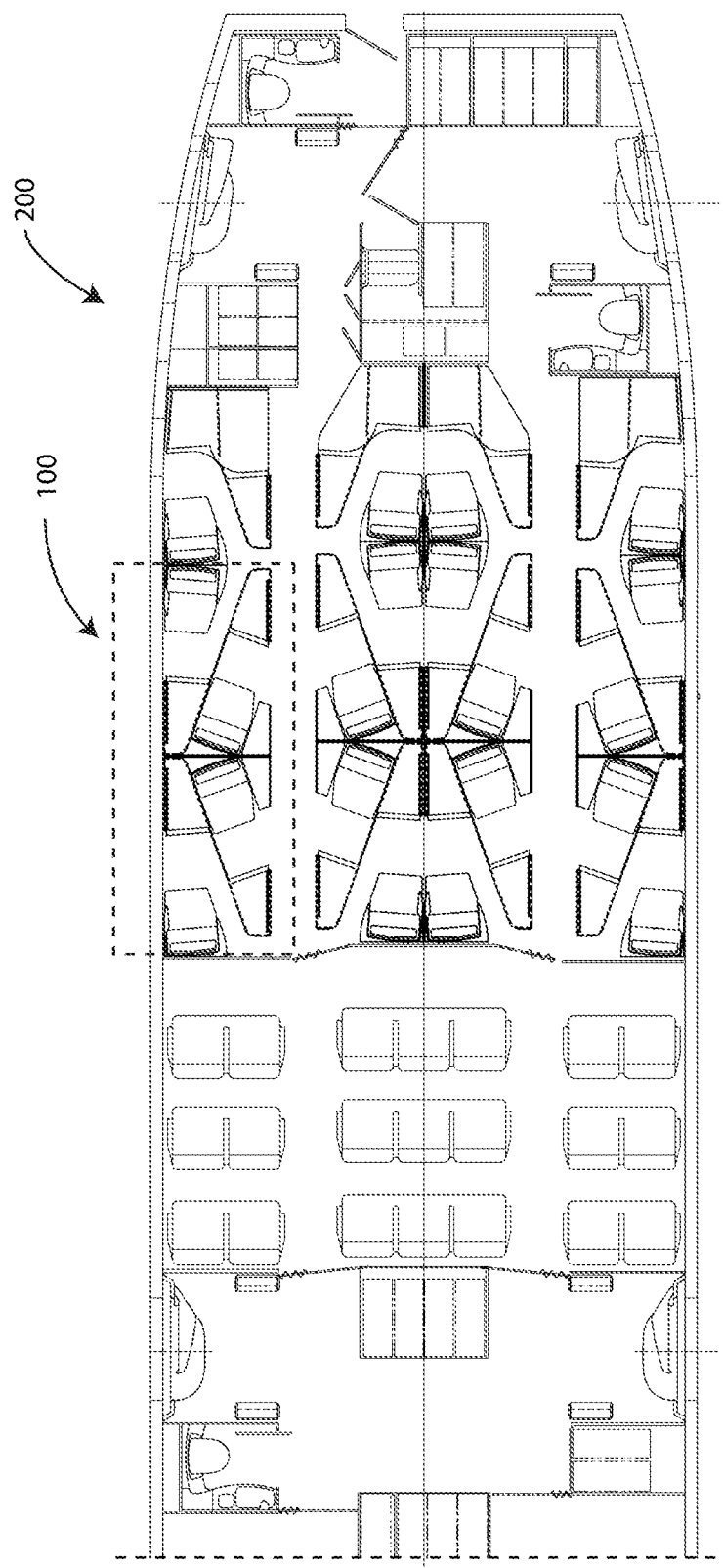
FIG. 16 schematically shows an eleventh arrangement of the seat array of the invention in an airplane cabin.

In the arrangements of FIGS. 14-16 the axis of the first 1 and second 2 seats is angled by a different angle with respect to the axis of the third 12 and fourth 13 seats. In particular, the axis of the first 1 and second 2 seats is angled by an angle comprised between 1° and 12°, preferably equals to 4°, and the axis of the third 12 and fourth 13 seats is angled by an angle of less than 18°, preferably 16°.

Further, according to the invention each dividing wall 3, 4 can be inclined by an angle comprised between 10° and 30° with respect to the longitudinal axis X-X of the cabin 100.

Figure 5:
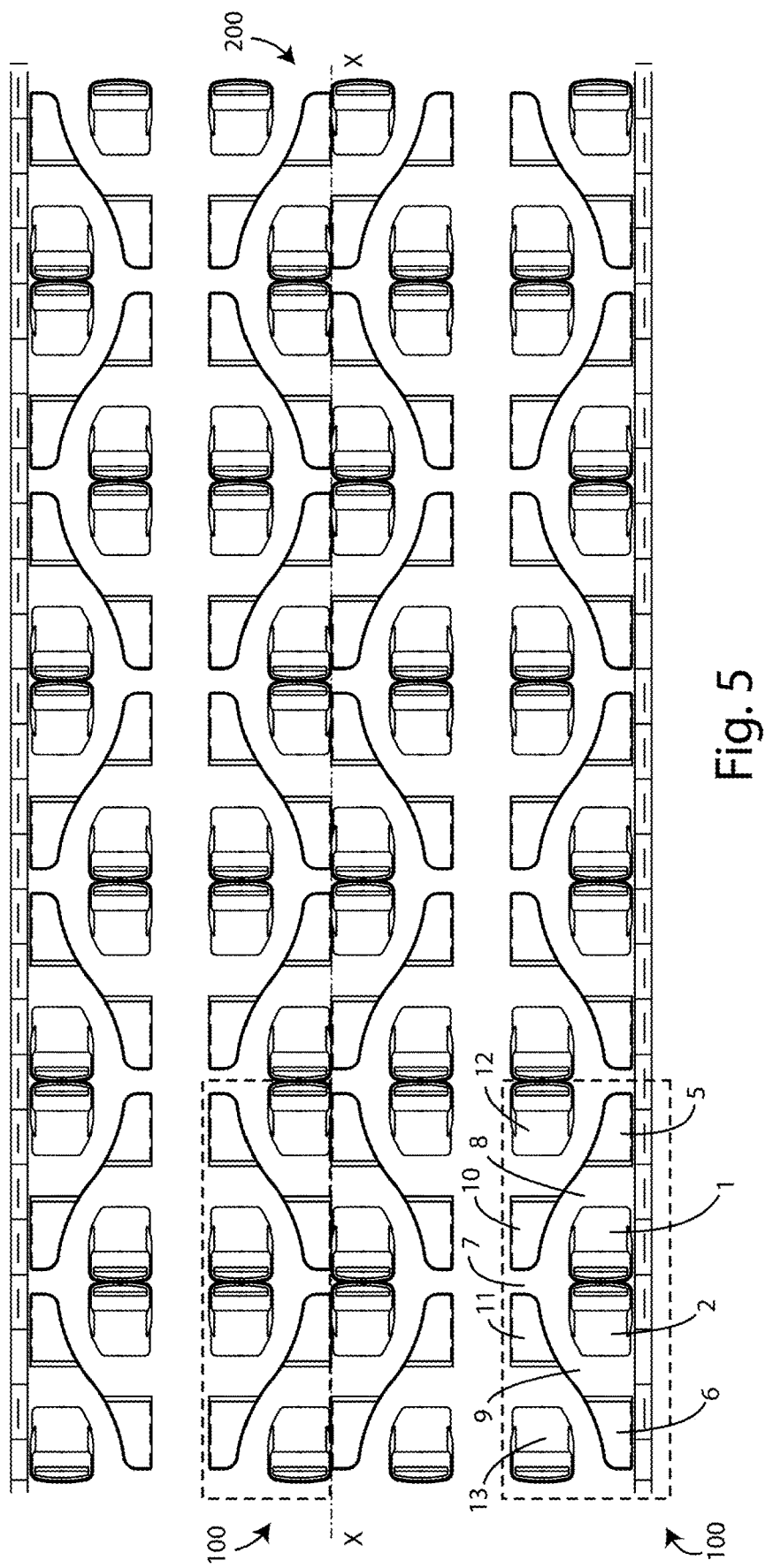
FIG. 5 schematically shows a fourth arrangement of the seat array of FIG. 1 in an airplane cabin.

FIG. 5, differently to the arrangement of FIG. 2, shows an arrangement within the cabin 200 of a plurality of arrays 100 that are not specular, as in the previous arrangements, with respect to the axis X-X, i.e. the central arrays 100 are offset with respect to the cabin 200 and not specularly coupled. The same arrangement of FIG. 5 could obviously be obtained with the seats 1, 2, 12, 13 inclined with respect to the axis X-X of the cabin 200, as in the arrangement of FIG. 4.

Figure 6:
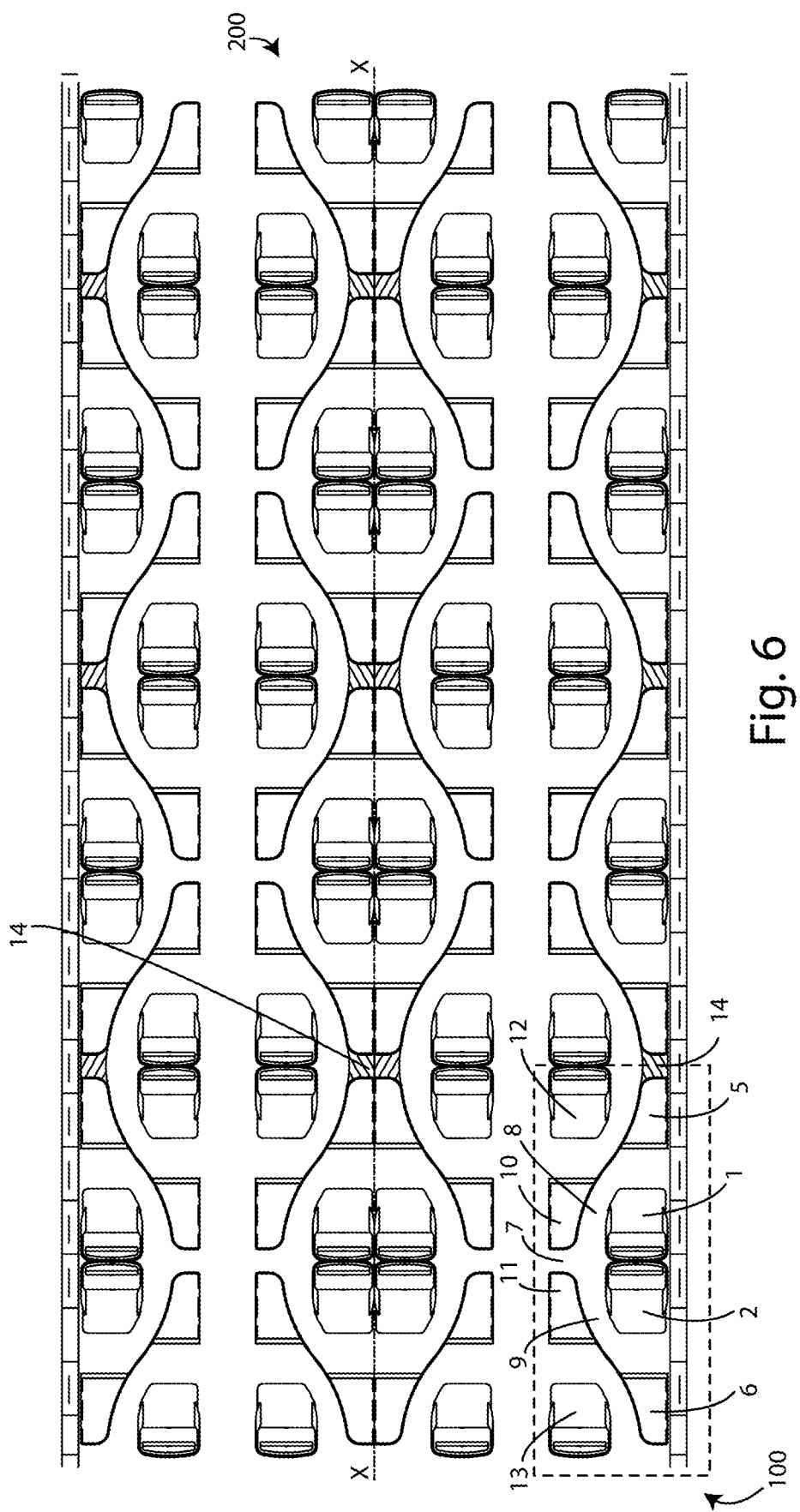
FIG. 6 schematically shows a fifth arrangement of the seat array of FIG. 1 in an airplane cabin.
Figure 7A:
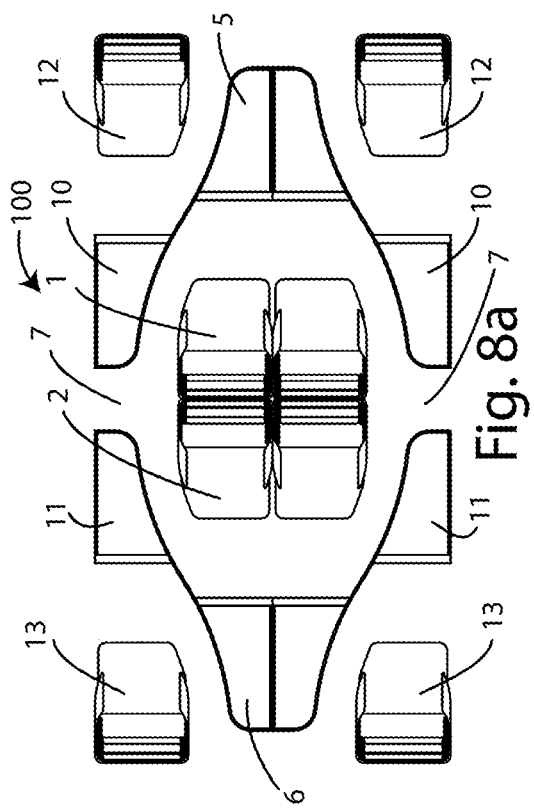
FIGS. 7a, 7b and 7c show, in a plan view and a side view, respectively, a second embodiment of a seat array according to the invention with the door in the closed and open position.
Figure 7B:
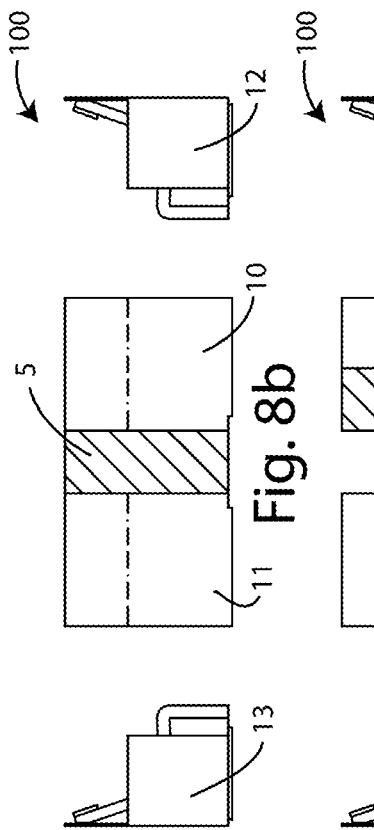
Figure 7C:
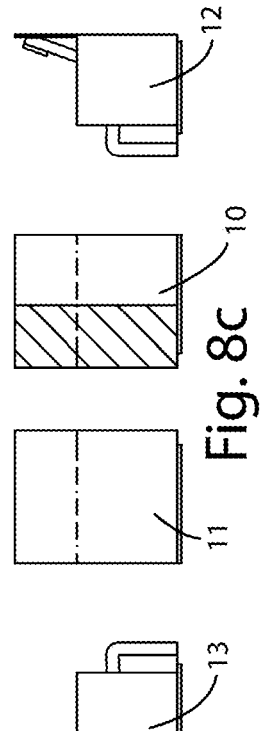
Figure 8A:
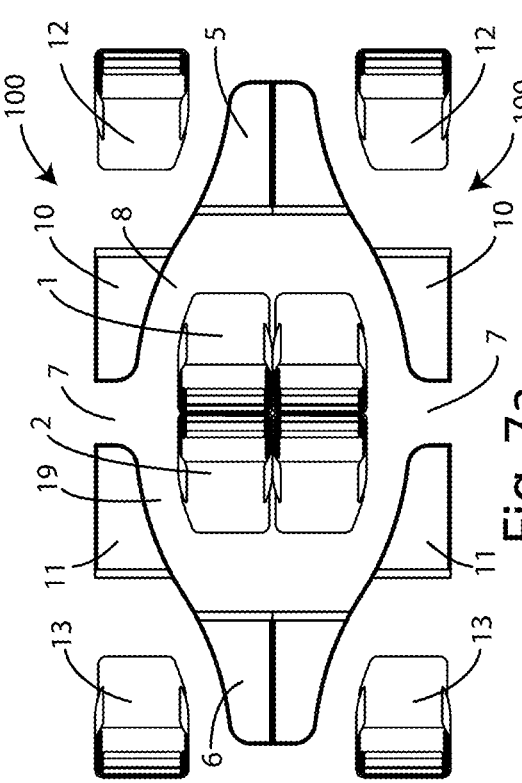
FIGS. 8a, 8b and 8c show, in a plan view and a side view, respectively, a third embodiment of a seat array according to the invention with the door in the closed and open position.
Figure 8B:
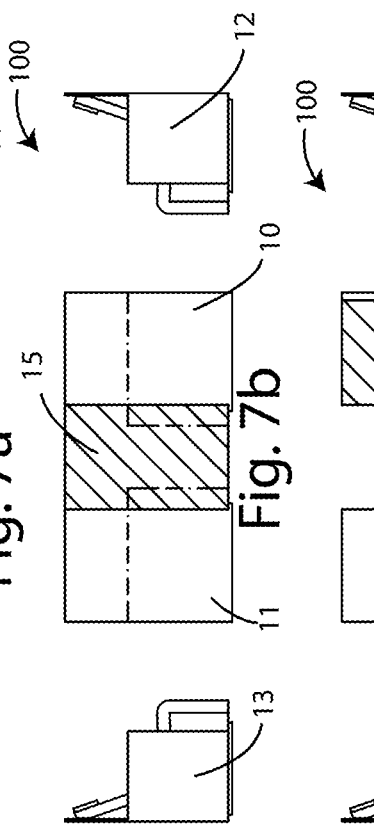
Figure 8C:
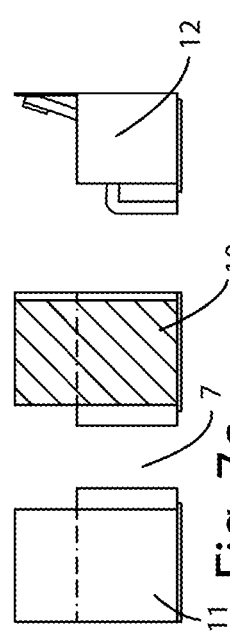

Lastly, FIG. 6 shows an arrangement within the cabin 200, wherein an item of furniture 14 is provided between the single modules of the array 100.

In each of the arrangements shown in FIGS. 2-6, in the case wherein the passage 7 ends against the dividing wall of the cabin 200, in particular at a dividing wall transversal to the longitudinal axis of the cabin for the division of different areas of the cabin, or at the seats 1, 2, 12, 13, the same passage will be closed, either directly by the dividing wall of the cabin 200, or by an appropriate panel.

In FIGS. 7, 8, 9 and 10, respectively, further embodiments of the seat array according to the invention are shown. In these figures the same numerical references used for the preceding figures will be used, and only the different characteristics will be described. Further, these characteristics can also be applied to seats 1, 2, 12, 13 with axes inclined with respect to axis X-X of the cabin 200, and to the arrangement with the item of furniture 14.

In this case, a door 15 (FIGS. 7 and 8), or a double door 15', 15" (FIGS. 9 and 10) is provided at the passage 7.

Figure 11:
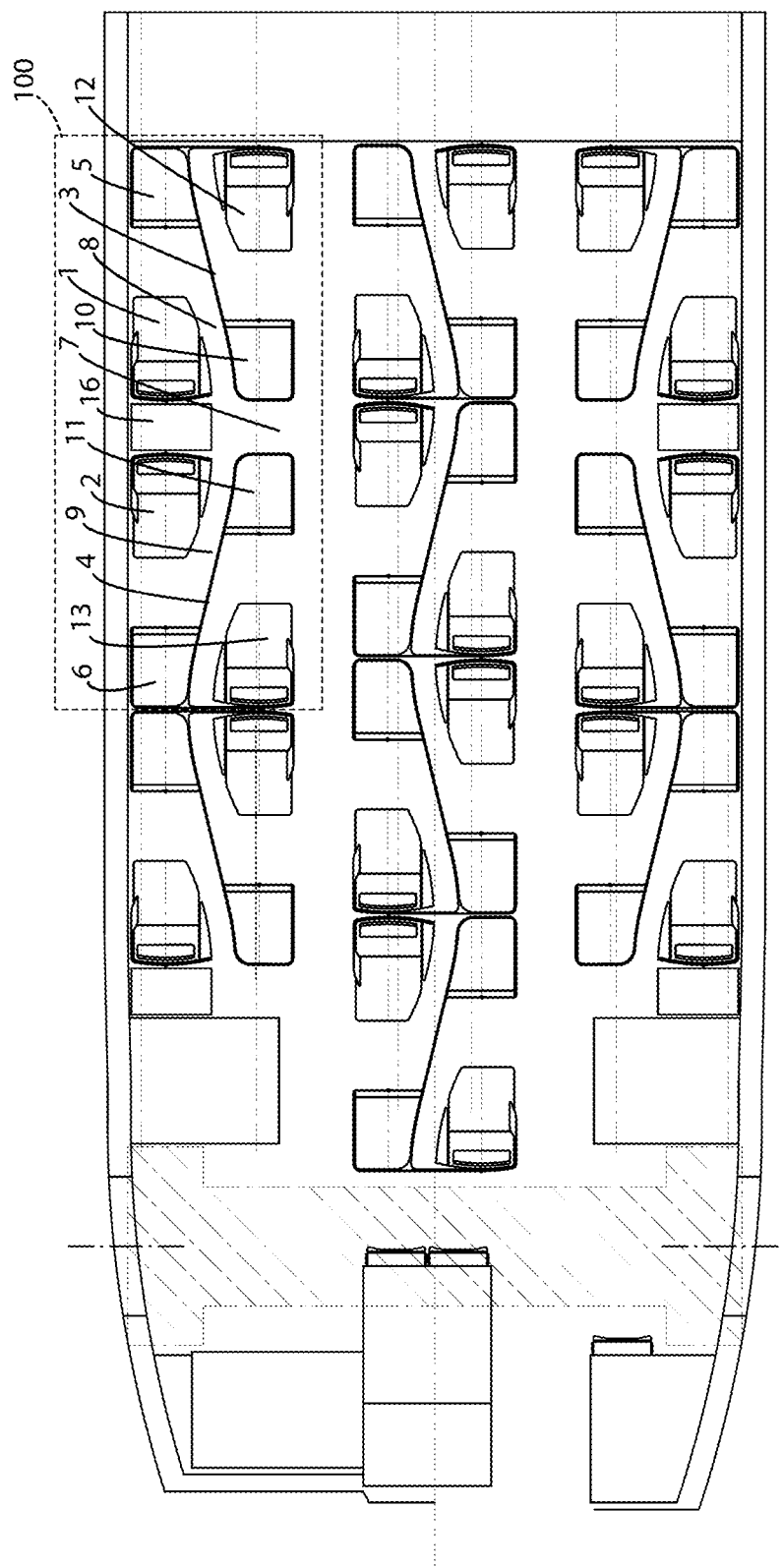
FIG. 11 schematically shows a sixth arrangement of the seat array of the invention in an airplane cabin.

FIG. 11 shows a sixth embodiment of the array according to the invention. Also in this figure the same numerical references used for the preceding figures will be used, and only the different characteristics will be described.

In this case, the terminal portion of the footrest is aligned with the backrest of the corresponding seat, and an item of furniture 16 can be provided between the backrests of the two seats 1 and 2.

The single arrays 100 are arranged offset, but could also not be so.

This solution can be combined with the various solutions provided in the preceding embodiments.

Figure 12:
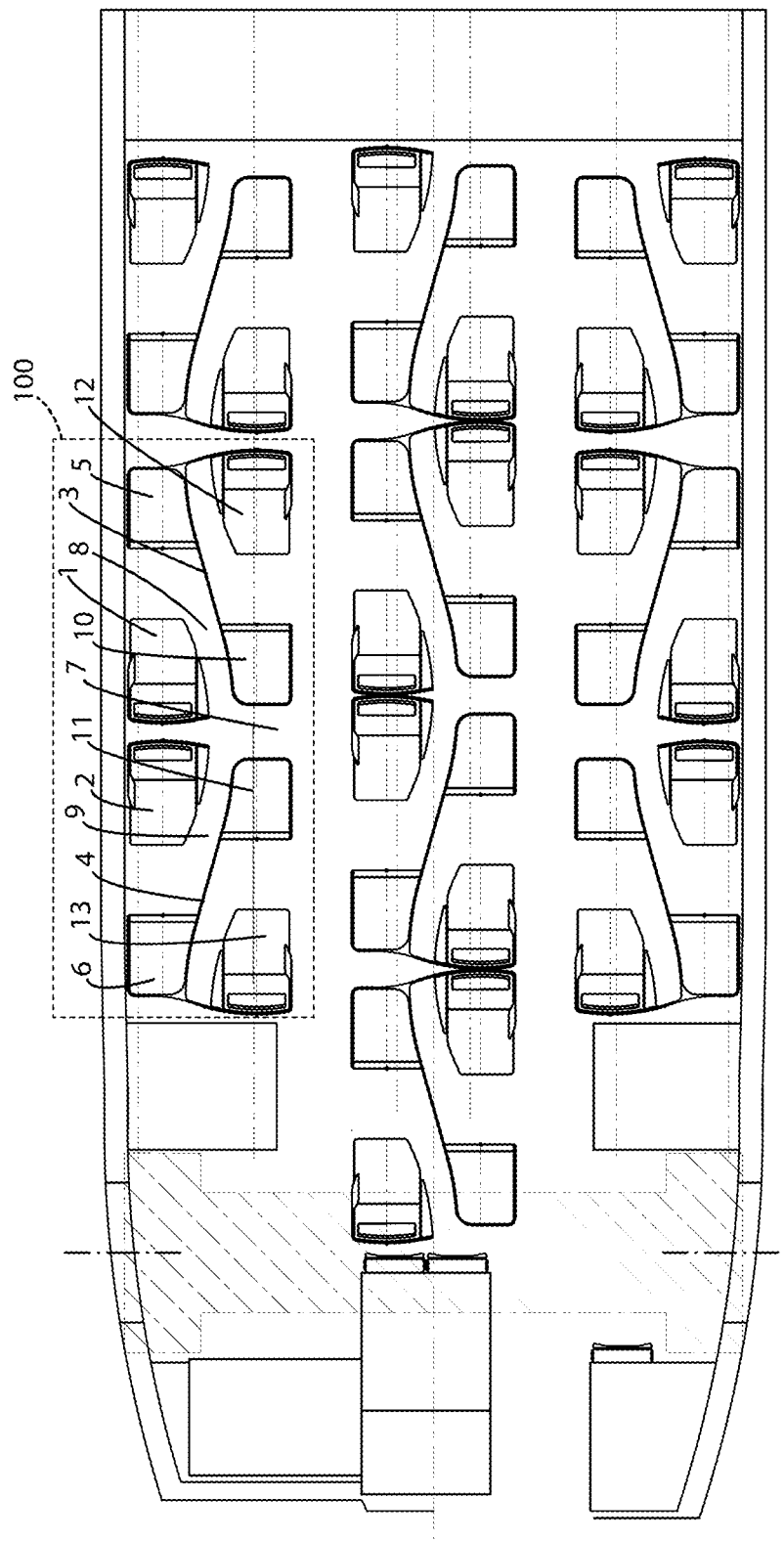
FIG. 12 schematically shows a seventh arrangement of the seat array of the invention in an airplane cabin.

Lastly, FIG. 12 shows a seventh embodiment of the array according to the invention. Also in this figure the same numerical references used for the preceding figures will be used, and only the different characteristics will be described.

In this case, the two backrests of the seats 1 and 2 are slightly distanced.

The single arrays 100 are arranged offset, but could also not be so.

This solution can be combined with the various solutions provided in the preceding embodiments.

The solutions shown in FIGS. 11 and 12 have been designed to further optimise the number of seats that can be located in the cabin, given a same surface area.

Figure 13:
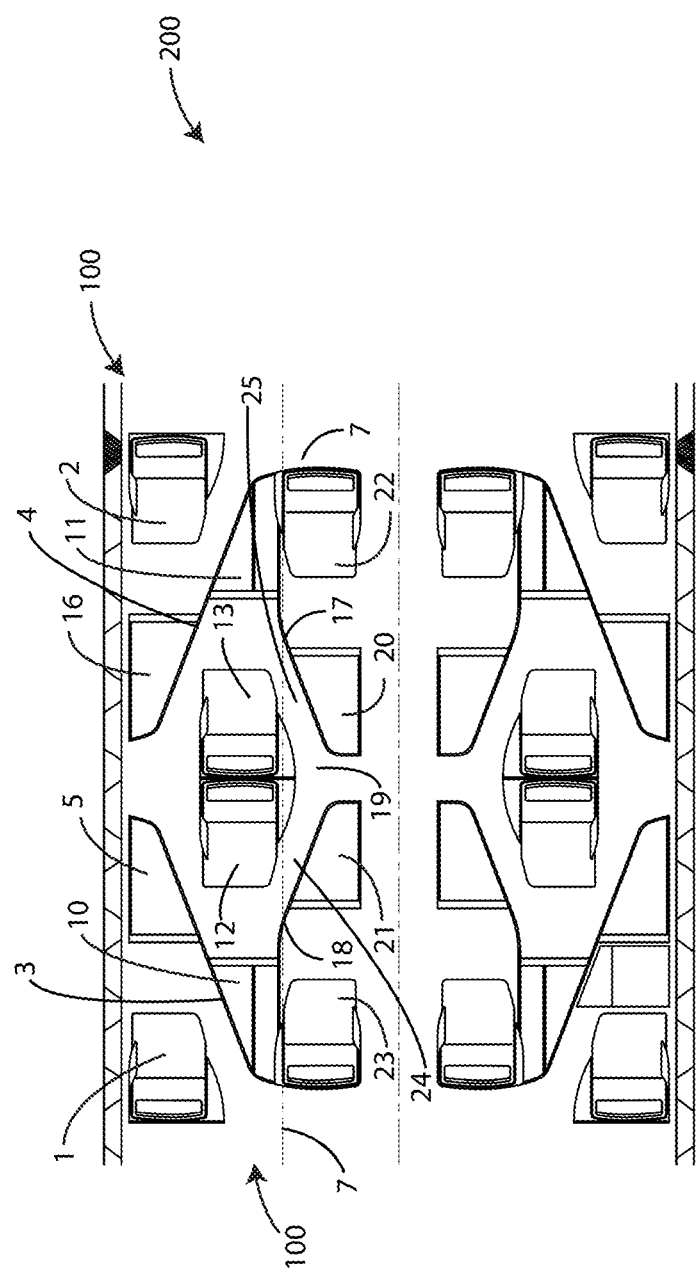
FIG. 13 schematically shows an eighth arrangement of the seat array of the invention in an airplane cabin.

Turning now to a description of the embodiment of FIG. 13, wherein the elements of the preceding embodiments will be denoted using the same numerical references, an embodiment is shown which is specially designed for an aircraft having a single central aisle (and therefore having smaller dimensions), wherein the business class provides a smaller number of passenger seats.

In this case, in an arrangement comprising at least two seat arrays 100 according to the invention included consecutively and substantially parallel to the longitudinal axis (X-X) of the cabin 200, a second pair of dividing walls 17, 18 is provided, creating a second passage 19, and each dividing wall bearing a respective footrest 20, 21 for a fifth 22 and a sixth 23 seat opposite one another.

Said second passage 19 is located at the opposite backrests of the third 12 and fourth 13 seats of two consecutive seat arrays 100, said second passage 19 leading to a lane 24, 25 for reaching the third 12 or fourth 13 seat.

The present invention has been described for non-limiting illustrative purposes, according to its preferred embodiments, but it is to be considered that any variations and/or modifications may be made by an expert in the field without departing from the relative scope of protection, as defined by the enclosed claims.

The invention claimed is:

1. A seat array comprising:
a first seat having a backrest;
a second seat having a backrest and being arranged to face away from the first seat;
a third seat having a backrest;
a fourth seat having a backrest and being arranged to face toward the third seat;
each of the first, the second, the third and the fourth seats being configured to move between at least a sitting position and a lying position;

a first dividing wall having a first portion spaced from a lateral side of the first seat and a second portion spaced from a front side of the first seat;

a first footrest arranged in front of the first seat and located adjacent the second portion of the first dividing wall;

a second dividing wall having a first portion spaced from a lateral side of the second seat and a second portion spaced from a front side of the second seat;

a second footrest arranged in front of the second seat and located adjacent the second portion of the second dividing wall;

a third footrest arranged in front of the third seat and located adjacent the first portion of the first dividing wall; and a fourth footrest arranged in front of the fourth seat and located adjacent the first portion of the second dividing wall, wherein a spacing between the third and the fourth footrests defines an entry/exit passage, wherein a spacing between the first seat and the first portion of the first dividing wall defines a first lane for accessing the first seat, and wherein a spacing between the second seat and the first portion of the second dividing wall defines a second lane for accessing the second seat.

2. The seat array of claim 1, wherein at least one of:
the first lane and the second lane has a curved shape; and
the first dividing wall and the second dividing wall have a curved shape.

3. The seat array of claim 1, wherein the backrests of the first and second seats are arranged adjacent one another.

4. The seat array of claim 1, wherein the first, the second, the third and the fourth footrests have a width that is less than a width of the first, the second, the third and the fourth seats.

5. The seat array of claim 1, wherein the entry/exit passage is located opposite the backrests of the first and second seats.

6. The seat array of claim 1, further comprising a furniture item located adjacent at least one of:
the backrest of the first seat;
the backrest of the second seat;
the first footrest; and
the second footrest.

7. The seat array of claim 1, wherein the entry/exit passage comprises a door.

8. An arrangement comprising:
a cabin; and
a plurality of seat arrays each according to claim 1 and arranged in the cabin.

9. The arrangement of claim 8, wherein the cabin is an aircraft cabin.

10. The arrangement of claim 8, wherein the cabin has a longitudinal axis (X-X) and an axis of the first, the second, the third and fourth seats is parallel to said longitudinal axis (X-X) of the cabin.

11. The arrangement of claim 8, wherein the cabin has a longitudinal axis (X-X) and an axis of the first, the second, the third and the fourth seats is angled to said longitudinal axis (X-X) of the cabin by an angle of one of: not more than 18 degrees; and between 10 and 120.

12. The arrangement of claim 8, wherein the first and the second seats have a facing angle that is different from a facing angle of the third and the fourth seats.

13. The arrangement of claim 12, wherein the facing angle of the first and the second seats in relation to a longitudinal axis (X-X) of the cabin, is one of:
between 1 and 12 degrees; and
4 degrees.

14. The arrangement of claim 12, wherein the facing angle of the third and the fourth seats, in relation to a longitudinal axis (X-X) of the cabin, is one of:
less than 18 degrees; and
16 degrees.

15. The arrangement of claim 8, wherein the first and the third seats each comprise a lateral armrest spaced from the first dividing wall and the second and the fourth seats each comprise a lateral armrest spaced from the second dividing wall.

16. The arrangement of claim 8, wherein the plurality of seat arrays comprise at least two symmetrically arranged seat arrays located adjacent one another, whereby two adjacent seats can form a double bed configuration.

17. The arrangement of claim 8, further comprising one of, a panel or a dividing wall arranged transversely between two of the plurality of seat arrays.

18. The arrangement of claim 8, wherein the plurality of seat arrays comprise at least two consecutive seat arrays arranged substantially parallel to a longitudinal axis (X-X) of the cabin and further comprising a pair of dividing walls configured to define a second entry/exit passage.

19. A seat array comprising:
a first seat having a backrest;
a second seat having a backrest and being arranged to face away from the first seat;
a third seat having a backrest;
a fourth seat having a backrest and being arranged to face toward the third seat;
each of the first, the second, the third and the fourth seats being configured to move between at least a sitting position and a lying position;
a first curvilinear dividing wall having a first portion spaced from a lateral side of the first seat and a second portion spaced from a front side of the first seat;
a first footrest arranged in front of the first seat and located adjacent the second portion of the first dividing wall;
a second curvilinear dividing wall having a first portion spaced from a lateral side of the second seat and a second portion spaced from a front side of the second seat;
a second footrest arranged in front of the second seat and located adjacent the second portion of the second dividing wall;
a third footrest arranged in front of the third seat and located adjacent the first portion of the first dividing wall; and
a fourth footrest arranged in front of the fourth seat and located adjacent the first portion of the second dividing wall,
wherein a spacing between the third and the fourth footrests defines an entry/exit passage,
wherein a spacing between the first seat and the first portion of the first dividing wall defines a first lane for accessing the first seat,
wherein a spacing between the second seat and the first portion of the second dividing wall defines a second lane for accessing the second seat, and
wherein the entry/exit passage is located opposite the seatbacks of the first and second seats and allows access to both the first and the second lanes.

20. The seat array of claim 19, wherein the backrests of the first and second seats are arranged adjacent one another.

21. The seat array of claim 20, wherein the first, the second, the third and the fourth footrests have a width that is less than a width of the first, the second, the third and the fourth seats.

22. A seat array comprising:
a first seat having a backrest;
a second seat having a backrest and being arranged to face away from the first seat;
a third seat having a backrest;
a fourth seat having a backrest and being arranged to face toward the third seat;
each of the first, the second, the third and the fourth seats being configured to move between at least a sitting position and a lying position;
a first diagonally extending and curvilinear dividing wall having a first portion spaced from a lateral side of the first seat and a second portion spaced from a front side of the first seat;
a first footrest arranged in front of the first seat and located adjacent the second portion of the first dividing wall;
a second diagonally and curvilinear dividing wall having a first portion spaced from a lateral side of the second seat and a second portion spaced from a front side of the second seat;
a second footrest arranged in front of the second seat and located adjacent the second portion of the second dividing wall;
a third footrest arranged in front of the third seat and located adjacent the first portion of the first dividing wall; and
a fourth footrest arranged in front of the fourth seat and located adjacent the first portion of the second dividing wall,
wherein a spacing between the third and the fourth footrests defines an entry/exit passage,
wherein a spacing between the first seat and the first portion of the first dividing wall defines a first lane for accessing the first seat,
wherein a spacing between the second seat and the first portion of the second dividing wall defines a second lane for accessing the second seat, and
wherein the entry/exit passage is located opposite the seatbacks of the first and second seats and allows access to both the first and the second lanes.

23. The seat array of claim 22, wherein the backrests of the first and second seats are arranged adjacent one another.

24. The seat array of claim 22, wherein the first, the second, the third and the fourth footrests have a width that is less than a width of the first, the second, the third and the fourth seats.

* * * * *